(12) United States Patent
Fergusson et al.

(10) Patent No.: US 11,059,244 B2
(45) Date of Patent: Jul. 13, 2021

(54) METHOD OF MAKING A COMPOSITE STRUCTURE

(71) Applicant: Fergusson's Advanced Composite Technology Limited, London (GB)

(72) Inventors: Alexander Douglas Fergusson, London (GB); Alexander George Newman, London (GB); Adam Paul Leon Mayall, London (GB); Teodor Boykov Balev, London (GB); Jonathan Philip Casey, London (GB); Tong Wang, London (GB); Marc-Antoine Lormel Di Guisto, London (GB)

(73) Assignee: Fergusson's Advanced Composite Technology Limited, London (GB)

( * ) Notice: Subject to any disclaimer, the term of this patent is extended or adjusted under 35 U.S.C. 154(b) by 358 days.

(21) Appl. No.: 15/580,739

(22) PCT Filed: Jun. 10, 2016

(86) PCT No.: PCT/GB2016/051717
§ 371 (c)(1),
(2) Date: Dec. 8, 2017

(87) PCT Pub. No.: WO2016/198883
PCT Pub. Date: Dec. 15, 2016

(65) Prior Publication Data
US 2018/0147799 A1 May 31, 2018

(30) Foreign Application Priority Data
Jun. 10, 2015 (GB) ..................... 1510065

(51) Int. Cl.
*B29C 70/68* (2006.01)
*B32B 5/02* (2006.01)
(Continued)

(52) U.S. Cl.
CPC ............ *B29C 70/68* (2013.01); *B29C 70/342* (2013.01); *B32B 3/12* (2013.01); *B32B 5/02* (2013.01);
(Continued)

(58) Field of Classification Search
None
See application file for complete search history.

(56) References Cited

U.S. PATENT DOCUMENTS 5,445,861 A * 8/1995 Newton .................... B32B 3/12
428/116
5,455,096 A * 10/1995 Toni ........................ B29C 44/12
428/116
(Continued)

FOREIGN PATENT DOCUMENTS

JP H08156150 * 12/1994
JP 2008290441 A * 12/2008
WO 98/10919 A2 3/1998

OTHER PUBLICATIONS

Machine English Translation of JP-2008290441-A, Accessed Jun. 30, 2020 (Year: 2008).*
(Continued)

*Primary Examiner* — Peter L Vajda
*Assistant Examiner* — Adrianna N Konves
(74) *Attorney, Agent, or Firm* — Renner, Otto, Boisselle & Sklar, LLP

(57) ABSTRACT

The present invention relates to a method of making a composite sandwich structure. The method comprises the steps of: providing a base lay-up on a surface, wherein the base lay-up comprises a first reinforcement material layer; providing a core layer on to the base lay-up, wherein the core layer comprises an open cellular structure and wherein the open cellular structure is at least partially filled with unbound particles; providing a top lay-up on top of the core
(Continued)

layer, wherein the top lay-up comprises a second reinforcement material layer; sealing the arrangement within a hermetically sealed enclosure; introducing matrix material into the arrangement via the at least one conduit through a pressure differential; and curing the matrix material.

16 Claims, 3 Drawing Sheets

(51) Int. Cl.
    *B32B 3/12*     (2006.01)
    *E04C 2/36*     (2006.01)
    *B29C 70/34*     (2006.01)
    *B32B 38/08*     (2006.01)
    *B32B 37/14*     (2006.01)
    *B32B 37/10*     (2006.01)
    *B29K 509/08*     (2006.01)
    *B29L 31/00*     (2006.01)

(52) U.S. Cl.
    CPC ........ *B32B 37/1018* (2013.01); *B32B 37/146* (2013.01); *B32B 38/08* (2013.01); *E04C 2/365* (2013.01); *B29K 2509/08* (2013.01); *B29L 2031/776* (2013.01); *B32B 2250/40* (2013.01); *B32B 2305/30* (2013.01); *B32B 2305/38* (2013.01); *B32B 2607/00* (2013.01)

(56) References Cited

U.S. PATENT DOCUMENTS

| | | | | |
|---|---|---|---|---|
| 6,030,483 | A * | 2/2000 | Wilson | B32B 3/12 156/292 |
| 6,500,517 | B1 * | 12/2002 | Brevart | F16F 1/37 324/125 |
| 2006/0046019 | A1 | 3/2006 | Wang et al. | |
| 2006/0228520 | A1 * | 10/2006 | Masukawa | B01J 35/04 428/116 |
| 2014/0127412 | A1 * | 5/2014 | Vosejpka | B29D 99/0089 427/373 |

OTHER PUBLICATIONS

Machine English Translation of JPH08156150, Accessed Jun. 30, 2020 (Year: 1994).*
International Search Report and Written Opinion for corresponding Patent Application No. PCT/GB2016/051717 dated Sep. 9, 2016.

* cited by examiner

METHOD OF MAKING A COMPOSITE STRUCTURE

This application is a national phase of International Application No. PCT/GB2016/051717 filed Jun. 10, 2016 and published in the English language, which claims priority to United Kingdom Patent Application No. 1510065.4 filed Jun. 10, 2015, which are hereby incorporated herein by reference.

FIELD OF THE INVENTION

The invention relates to a composite sandwich structure that incorporates microspheres and a method of making the same.

BACKGROUND TO THE INVENTION

Composite sandwich structures comprising syntactic foam cores have advantageous physical properties, especially in respect of their strength to weight ratio in general, and their out of plane compressive strength in particular. Other advantages include resistance to corrosion and fire, plus thermal and acoustic insulation properties. Consequently, syntactic sandwich panels are suitable for a wide range of applications and are particularly desirable in transport industries including aviation, shipping, road and rail. Other applications include blast walls including for use in power substations, marine components including deep sea devices, oil rig components and structures, and turbine components, including wind turbines.

Existing methods of manufacturing these structures have various disadvantages. For example, where syntactic foams are simply bonded between two skins, the bond between the core and the skins may be weak and can lead to the skins detaching. To avoid this problem it is known in the art that pre-cured porous syntactic foams can be manufactured and then infused together with skins to create an integral structure. Such a method still requires multiple curing/processing stages and results in a structure with poor mechanical properties. Other processing approaches include pre-mixing microspheres and matrix in the desired proportions, which results in highly viscous mixes with a large amount of entrapped air. Furthermore, the achievable volume fraction of microspheres to resin is often limited by flow requirements (for processability), which in turn increases the density of the final structure. The use of syntactic prepregs is also known in the art, but these also offer limited volume fractions, are fragile and difficult to handle in their green preform state, and expensive.

The simple deposition of dry microspheres followed by skin placement provides its own set of problems. Microspheres easily become airborne and, due to their flow characteristics, they cannot be readily fixed to a geometry which makes distortion of the core shape an issue.

SUMMARY OF THE INVENTION

It is an object of the present invention to provide a method of making syntactic cored sandwich panels with a reduced number of processing/curing stages, which addresses the above mentioned issues by creating a structure with a high volume fraction of microspheres, which is substantially void free, creates a good bond between the core and the reinforcing skins with a single phase of matrix material throughout, and offers a reduced materials cost. It is a further object of this invention to provide an efficient method of creating such structures in large and/or complex shapes with minimum waste.

Accordingly, the invention is directed to a method of making a composite sandwich structure comprising the steps of:
   providing a base lay-up on a surface, wherein the base lay-up comprises a first reinforcement material layer;
   providing a core layer on to the base lay-up, wherein the core layer comprises an open cellular structure and wherein the open cellular structure is at least partially filled with unbound particles;
   providing a top lay-up on top of the core layer, wherein the top lay-up comprises a second reinforcement material layer;
   introducing matrix material into the arrangement via a pressure differential; and
   curing the matrix material.

In a preferred embodiment, the particles are hollow glass microspheres, however, this may extend to other types of particles such as non-hollow and irregular shapes, including fibrous matter (e.g. milled carbon fibre), or combinations thereof. The particles are unbound and so are in the form of particles that are not bonded or fixed relative to one another. For example, the particles may be able to flow and they might be in the form of dry particles or they may be part of an emulsion or suspension. Once the unbound particles are in the required position, the matrix material is introduced and cured to bind them in place, thereby forming a solid structure. The particles may be selected from a group comprising any one of the following types: microspheres (both hollow and solid); fibres; platelets; nanotubes; core-shell particles; self-assembling macro molecules; fly ash; nano-clays; fused colloidal particles; faceted particles; angular and subangular particles.

Advantageously, an enclosure is positioned around the arrangement and the enclosure is hermetically sealed and is provided with at least one conduit therethrough to allow fluid communication with the inside of the enclosure. The conduit(s) may be used to allow the flow of matrix material into the enclosure, preferable between the enclosure and the outer surface of the arrangement, or to remove air from within the enclosure, thereby creating a pressure differential. Other substances may pass through the conduit(s) either into or out of the enclosure.

In one embodiment, the surface is the bottom internal surface of a mould and the mould comprises sidewalls. The use of a mould provides a stable surface on which to arrange the lay-up and can be used to assist in the formation of a particular shape or structure. It can also provide one or more easily accessed inlet and/or outlet ports for connecting conduits. The conduits may be attached to resin sources, vacuum pumps, air, gas or other items, that may be useful in infusion, curing or carrier liquid (discussed lower down) removing processes. Furthermore, the mould may comprise features to facilitate the distribution of resin across the component. The mould may comprise a top mould section to provide a particular shape or surface for the top lay-up.

It is advantageous that the cellular structure is a honeycomb material and the honeycomb comprises an open-cellular structure. The use of a honeycomb material provides a particularly stable structure and an open-cellular structure allows the particles to fill the honeycomb material, thereby enhancing the properties of the sandwich structure once cured. The honeycomb is also used as a means of providing controlled and/or uniform thickness of the sandwich panel because the dimensions of the cellular core can be controlled and the microspheres arranged within that core. When the reinforcement material is applied, the overall thickness of the panel can be controlled within very small tolerances. The use of such a cellular core also enables the fabrication of panels with curvature as they constrain the flow of the filler material and hold it in place to define the final component geometry. Additionally, the use of a cellular core may improve mechanical properties such as crack propagation resistance.

As used herein, the term 'open cellular structure' has the customary meaning known to those having ordinary skill in the art, i.e. an open cellular structure is a structure that is full of cells that aren't completely encapsulated. In other words, the cells are deliberately left open. This is in contrast to a closed cell structure that is made up of cells that are, as the name suggests, completely closed.

A further advantage of the present invention is its ability to constrain the movement of microspheres as resin is introduced. If resin were to flow through unbound microspheres in absence of the honeycomb then the microspheres would be drawn along with the resin flow, which would lead to significant variation in microsphere distribution across the component. The honeycomb constrains movement of the microspheres whilst still allowing fluids to flow through them, thus enabling the production of composite foam cored components with consistent, controllable and high volume fractions across the part and without recourse to pre-binding the microspheres.

Depending on the requirements of the specific application, the unbound core layer consisting of a cellular structure filled with unbound particles may be fabricated either inside the mould or it can be fabricated separately and then transferred and positioned in the mould. The latter may be especially desirable for the manufacture of parts with complex contours and/or large parts where multiple core sections need to be joined together in order to form the final shape. In order to constrain the particles within the core while transferring, a carrier liquid can be used (discussed lower down) and/or barrier fabrics on either side of the core (also discussed lower down).

Through the use of a pressure differential, preferably incorporating subatmospheric pressure, tightly packed particles can be achieved resulting in a reduced density of the final matrix-bound structure. Additionally, the high volume fractions of microspheres provided using the present invention result in better specific mechanical performance, particularly where high grade microspheres are employed.

Subsequent introduction and curing of matrix material simultaneously into the core and skin layers provides a structure which has a single matrix phase, resulting in significantly improved mechanical properties and a strong bond between the skins and the core which is resistant to delamination and crack propagation. No further curing/bonding steps are required which saves a significant amount of processing time. Furthermore, particularly in the case where vacuum is used, the uncured component is evacuated of all gasses prior to resin introduction, leaving a substantially void-free component.

In certain cases it may be preferable to mix the particles with a carrier liquid prior to filling the cellular structure and introducing the matrix material. This results in several immediate processing advantages.

Firstly, it eliminates the hazard of microsphere dust. Microspheres, due to their light weight and small size, become easily air-borne and are considered a health hazard. Secondly, creating an intermediate substance consisting of microspheres and carrier liquid enables easier handling. Different consistencies of the mix can be achieved by varying the amount of carrier liquid in the mix, ranging from a paste or dough like consistency to a liquid consistency, which can be easily mixed, transported, and deposited. Excess carrier liquid can be removed from the mix, once it has been deposited, preferably by incorporating vacuum pressure. In certain cases it might be desirable to use a carrier liquid which is compatible with the matrix system, for example the matrix resin itself, or a component/components of the resin, for example, a polyglycidyl ether when the matrix is formed from epoxy resin. Alternatively, water or other solvents may be used for considerations such as cost, availability, and viscosity.

Thirdly, upon removal of the excess carrier liquid the microspheres pack together to form a tightly packed arrangement due to cohesive and adhesive forces. Preferably a vacuum source is used to draw gas through and out of the arrangement which can help to produce a jammed packing of the microspheres. This, in turn, ensures the microspheres are filling the maximum volume of the honeycomb cells and is a precursor for a lower density final product. It also reduces the scope for further compaction/shrinkage when resin is introduced; such compaction and shrinkage leads to reduced dimensional accuracy and skin to core bond strength. Furthermore, the cohesive and adhesive forces and the tightly-packed arrangement allow the particles to hold themselves together and to the honeycomb walls within the cellular structure which permits the separate preparation and then transferring of the core layer while maintaining its structural integrity. This is especially true in the case of carrier liquids with high surface tension, such as water.

In order to impart specific structural properties to various sections of the core, it may be desirable to fill various sections of the honeycomb with different types of particles or combinations thereof, for instance microspheres and microfibres. For example, it may be desirable to employ a first type of particle for the central section of the sandwich structure and a different type of particle to be used in the periphery of the sandwich structure. The type of particle may vary according to the material, density, structural properties and/or its size and/or shape. Alternatively, cellular structures filled with different materials can be placed next to each other when positioning the core layer of the sandwich structure. Solid/preformed structures can be used to effect local sandwich panel properties, for example composites and alloys. In one embodiment of the invention the pre-formed structures are porous to allow resin to infuse through them and create a good bond with the skins of the sandwich panel.

In some circumstances it is advantageous that a barrier layer is provided on at least one side of the core layer. The barrier material prevents the movement of microspheres into the reinforcement material but still allows the passage of fluids, particularly the matrix material and carrier liquid, where used. Microsphere migration into the reinforcement layer may uncontrollably or undesirably alter or reduce the structural performance of the reinforcement skin, although there may be circumstances where this is an acceptable or even desirable property, in which case the barrier layer may be removed.

A vacuum media may be provided, between one or both lay-ups and the mould, which is substantially porous and permeable even whilst under pressure. The use of such a vacuum media material allows for faster flow of fluid across the arrangement which, in turn, provides quicker and more complete infusion of the sandwich structure. Additionally, a release material may be provided between the reinforcement layer and the mould or between the reinforcement layer and the vacuum media.

The disclosed invention offers a further advantage in that it combines materials in a relatively unprocessed form: dry fibres, dry particles and resin, which allows for a significant reduction in the raw material cost as opposed to processes which use pre-impregnated fibre or similar. Furthermore, the particles forming the core can be collected and recycled, either in their dry form or within a carrier liquid, which reduces waste.

BRIEF DESCRIPTION OF THE DRAWINGS

An embodiment of the invention will now be described, by way of example only, and with reference to the accompanying drawing, in which.

DETAILED DESCRIPTION OF EXEMPLARY EMBODIMENTS

Figure 1:
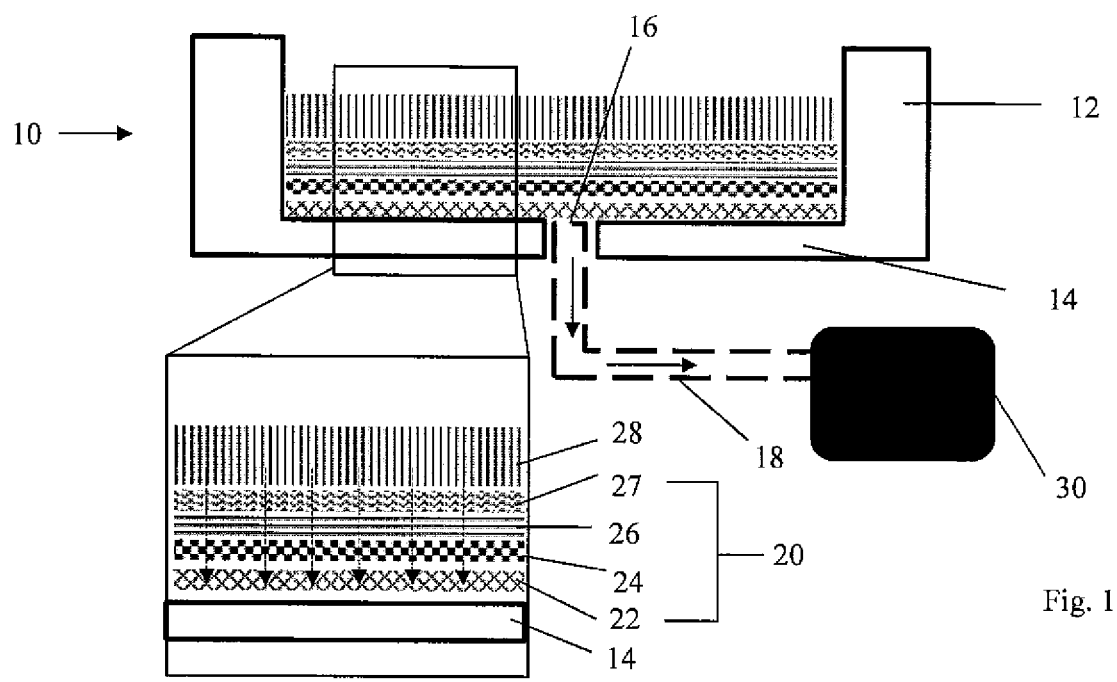
FIG. 1 is a diagram showing a step in a method in accordance with the present invention.
Figure 2:
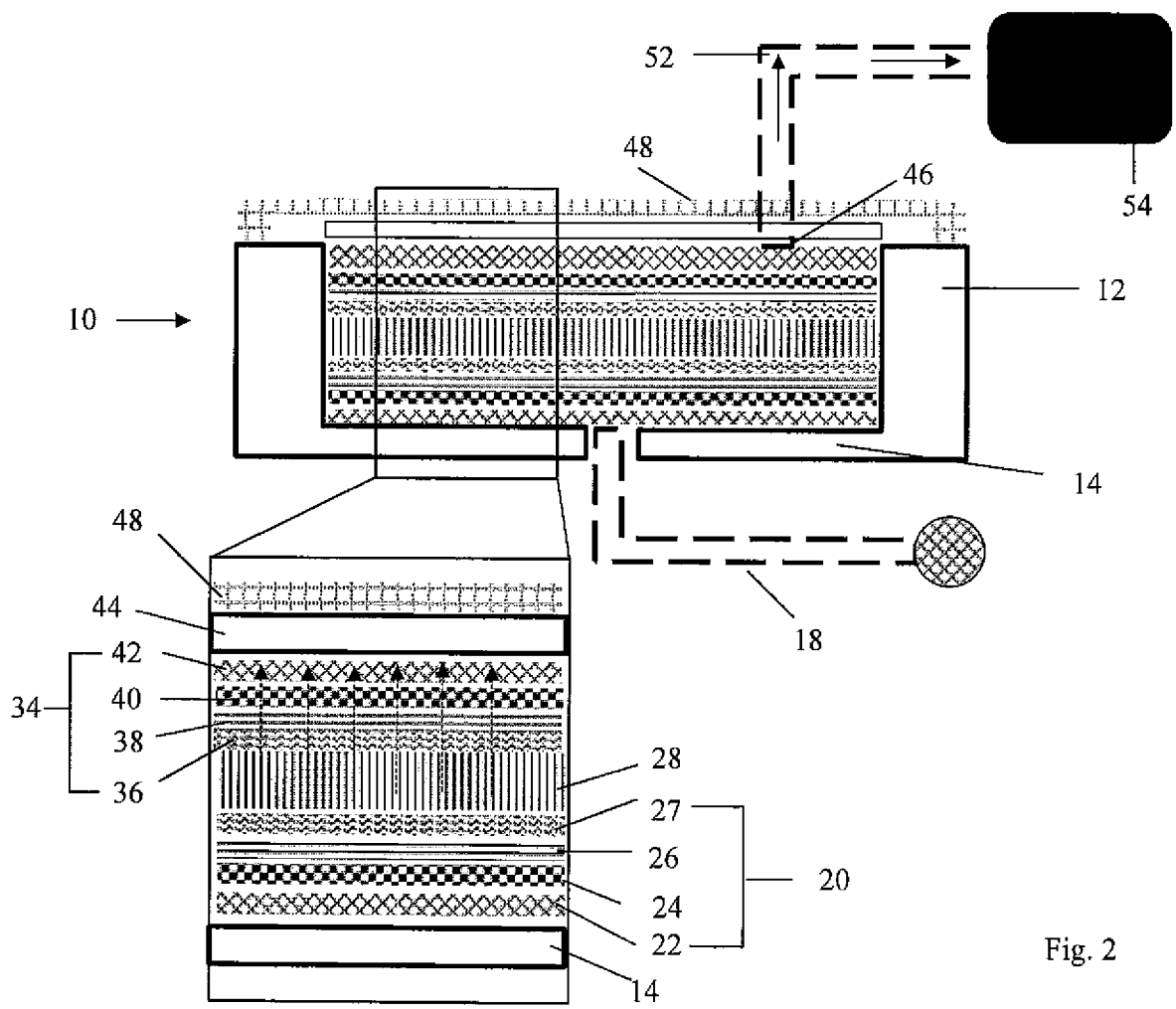
FIG. 2 is a diagram showing a further step of the method of FIG. 1.
Figure 3:
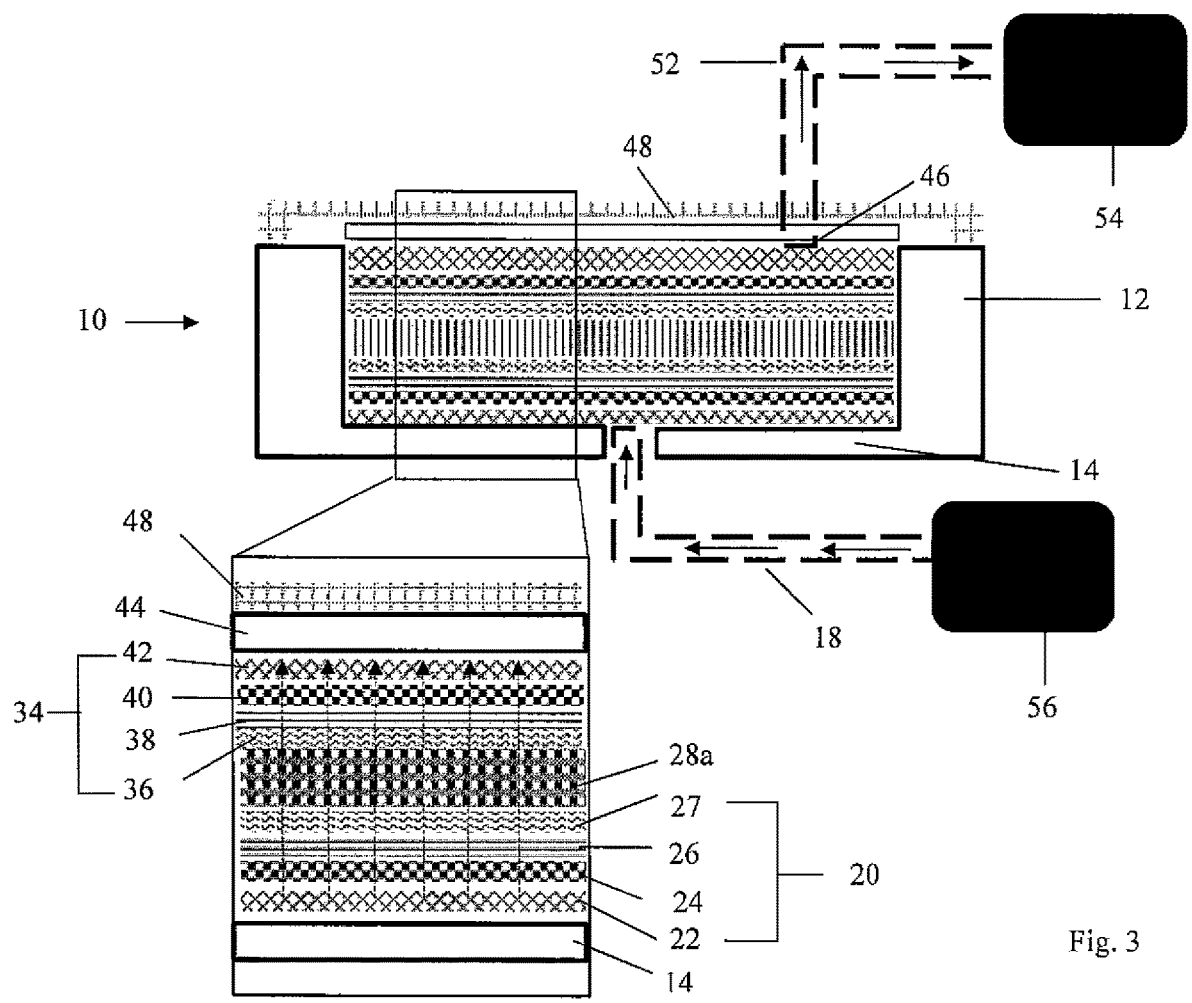
FIG. 3 is a diagram showing another step in the method of FIG. 1.

FIGS. 1 to 3 show an arrangement 10 comprising a mould 12 having a lower internal surface 14. The mould 12 is a flat open mould with sufficiently high sides to contain the lay-up arrangement that is to be positioned therein. The lower surface 14 is provided with a first aperture 16 to which is connected first conduit 18. A base lay-up 20 is arranged on the lower internal surface 14, the base lay-up 20 comprising:
a vacuum media 22 in the form of a mesh;
a release material 24;
a reinforcement material 26; and
a barrier layer 27.

Once the base lay-up 20 is arranged in the mould 12, a cellular structure 28 is applied to the base lay-up 20 and a homogeneous liquid mixture of carrier liquid and microspheres is poured on top of the cellular structure 28. Because the mixture is able to flow, it settles in a substantially uniform thickness in accordance with the profile of the cellular structure 28, although it may be desirable to level it off further to ensure a more even layer. Once the carrier liquid and microsphere mixture has been applied to the cellular structure 28, a vacuum pump 30 is connected to the conduit 18 and operated. The vacuum pump 30 sucks excess carrier liquid through the base lay-up 20 and through the aperture 16 of the internal lower surface 14 of the mould 10. This also compacts the microspheres to create a more densely packed microsphere arrangement. The pressure differential created by the vacuum pump 30 in combination with the vacuum mesh 22 results in the substantially uniform removal of the carrier liquid over the whole area of the lay-up arrangement. Once excess carrier liquid has been removed, leaving behind a tightly packed self-supporting arrangement of wet microspheres, excess microspheres are removed from the top of the honeycomb so that the thickness of the microsphere layer is defined by the thickness of the honeycomb. The removed microspheres can then be collected and reused.

Once excess carrier liquid and microspheres have been removed, the conduit 18 is sealed and the vacuum pump 30 may be disconnected/turned off. Subsequently, a top lay-up 34 is applied on top of the microspheres 28a, with the top lay-up 34 mirroring the bottom lay-up 20 in that it comprises a barrier layer 36 adjacent the microspheres 28a and the cellular structure 28, a reinforcement material 38 on top of the barrier layer 36, a release material 40 on the upper surface of the reinforcement material 38, and a vacuum media 42 next to the release material 40. A top mould 44, which may be in the form of a floating caul plate, is applied on top of the top lay-up 34. The top mould 44 fits within the internal volume of the mould 12 so that it can apply pressure to the composite lay-up. The top mould 44 is provided with an aperture 46 thereby allowing fluid communication from within the lay-up arrangement to the external side of the top mould 44. A vacuum film 48 is then placed over the top of the mould 12 and secured thereto in order to hermetically seal the internal cavity of the mould 12. The vacuum film 48 is also provided with an aperture. A second conduit 52 is attached to the aperture 46 of the top mould 44 and the vacuum film 48.

The second conduit 52 is connected to a vacuum pump 54, which is operated to remove more carrier liquid from the microsphere and carrier liquid mixture. Heat may also be applied to assist in evaporating/boiling the carrier liquid, or reducing its viscosity, and the first conduit 18 may be opened to allow for the flow of air through the arrangement to assist with removing carrier liquid. In another embodiment, where the carrier liquid is the matrix material used for infusion or compatible therewith, full removal of the carrier liquid would not be required and evaporation/boiling steps are not necessary. The barrier layers 27 and 36 are provided with apertures therein to allow the passage of air, carrier liquid and resin, but that are sufficiently small to prevent the passage of microspheres 28a therethrough.

Once as much of the carrier liquid has been removed as is required, the first conduit 18 is connected to a resin source 56 and the vacuum pump 54, which is connected to the second conduit 52 is operated. Resin is drawn into the arrangement through the aperture 16 of the mould 12 and it passes into the base lay-up 20. The resin subsequently passes into the cellular structure 28 and it envelopes the microsphere layer 28a before passing through to the top lay-up 34. As the resin ingresses into the composite lay-up, volatiles and/or air in the arrangement pass up towards, and into, the second conduit 52. When the arrangement has been fully infused with resin, it can then be cured to create a composite sandwich structure with reinforcement skins 26 and 38 bonded to the microsphere-filled cellular core 28.

Figure 4:
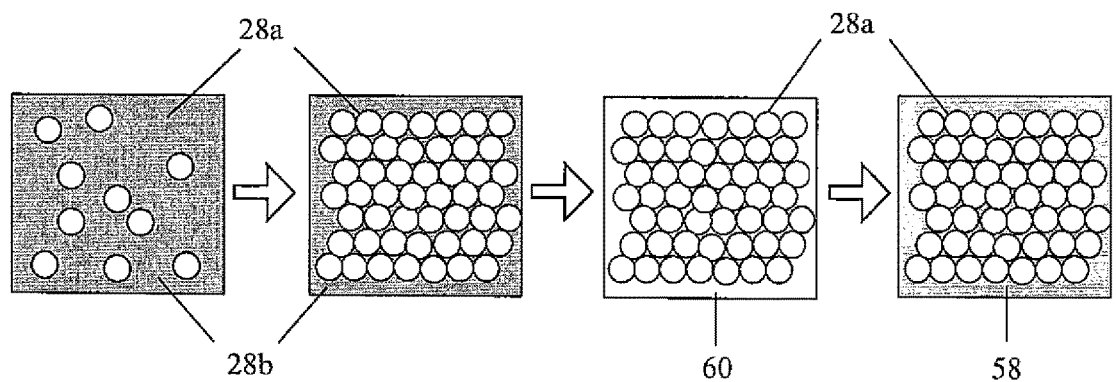
FIG. 4 is a diagram showing the state of microspheres used in a process of the present invention.

FIG. 4 shows the microspheres 28a during the process shown in FIGS. 1 to 3, although for simplicity the cellular structure is not shown. The microspheres 28a are initially in the carrier liquid solution. Excess carrier liquid 28b is then removed from the mixture 28 during the operation of the vacuum pumps 30 and 54 to pack the microspheres more tightly. The residual carrier liquid is removed to leave densely packed microspheres 28a within the cellular structure that are effectively in a vacuum 60, which are then infused with resin 58 to bind, or fix, them in place in the cellular core. The resin 58 ingresses between the microspheres 28a and bonds them in place to become part of the core of the composite structure in combination with the cellular structure.

The lower surface of the mould and the top mould are preferably rigid, which allows more accurate shaping of the sandwich structure. However, the use of a top mould is not compulsory. Further features, such as resin flow channels, could be incorporated into the mould in order to provide a better means of distributing matrix material across the component. Vacuum sealing of the mould can also be conducted with the use of disposable plastic films or with reusable vacuum bags such as those made of silicone.

In one embodiment, the mould 12 may not be required because the microspheres can be contained within the honeycomb core without the need for the walls of the mould 12.

Depending on the usage of carrier liquid, the microspheres can have varying consistencies, in accordance with processing requirements. For example, if no carrier liquid is used and the microspheres remain dry, this negates the need for carrier liquid removal or evaporation. However, this allows microspheres to become easily airborne, they are more difficult to pack in a tight arrangement, and cannot be prevented from flowing out of honeycomb cells if shapes with curvature are to be manufactured. When a carrier liquid is used these issues can be overcome. A liquid mix of microspheres and carrier liquid, followed by excess carrier liquid removal allows for the quick and easy transportation, deposition and spreading of the mix. Also due to cohesive forces of the carrier liquid, the microspheres are packed tightly and held together. Additionally, the use of a vacuum source to draw gas through the material prior to the materials being hermetically sealed leads to further compaction of the microspheres prior to moulding, thus enabling a higher volume fraction of microspheres to be obtained within the material.

In another embodiment of the invention, the whole or at least part of the layup arrangement is first prepared in a separate area and then transferred onto the final moulding surface. For example, the core layer of microspheres within a honeycomb core can be prepared separately using a process similar to that disclosed in FIG. 1, or a different process. Following the removal of the excess carrier liquid, the particles within the cellular core remain wet but are tightly packed. The surface tension of the liquid acts to hold them together within the cellular structure even though there is no chemical bonding between them. This results in a self-supporting yet formable structure which can easily be removed from the mould, transferred, and then placed onto a different surface/mould without affecting its integrity. This new surface may comprise a conduit to allow for the introduction of matrix material and bottom reinforcement material, and, optionally, vacuum media and release material is laid up onto the surface prior to placement of the prepared core. After core placement the top material layers are positioned and matrix material is introduced and cured in accordance with the process described herein, as shown in FIG. 3. This allows for a quick and efficient method for manufacturing sandwich panels with complex shapes. Furthermore, separate sheets of microsphere filled honeycomb can be laid up next to or on top of each other for the manufacture of large parts. Any resultant gaps between separate sheets of core precursor material can be subsequently filled with particles, either dry or in a carrier liquid. An additional benefit of preparing core layers prior to placing them in the final mould is that a dedicated mould can be used for their preparation, which can improve the speed and efficiency of the preparation process.

This process of preparing core preforms and subsequently forming, infusing, and curing them can easily be adapted to the manufacture of syntactic foams without laminate reinforcements.

The resin may be infused from the second conduit rather than the first, with a vacuum pump connected to the first conduit. Alternatively, or additionally, further conduits may be applied to the arrangement to the removal of carrier liquid, the supply of resin or for a vacuum source. An advantage of matrix material, or resin, infusion from the bottom of the arrangement is that the volatiles are driven off and the void content can be minimized because the volatiles naturally rise to the top of the arrangement.

An aspect of the present invention is that the matrix material is applied to the lay-up using a very short effective flow path as when compared to conventional resin introduction processes. By positioning the inlet and/or outlet ports, resin flow channels and/or vacuum mesh, and release fabric along the top and/or bottom lay-ups, the flow path of the matrix material is reduced in comparison to the ports being positioned at the sides of the arrangement. Unlike conventional moulding methods, for example, resin transfer moulding, the resin is not driven through the length and width of the reinforcement, but through its thickness. Consequently, much steeper pressure gradients may be achieved with this method even though the total pressure change may only be around an atmosphere of pressure. This reduces the time required for resin infiltration. In addition, as the distance being traveled is far shorter than in resin transfer moulding, less pressure or force is needed to drive the resin through all the reinforcement before it cures. Such a reduction in the flow path length results in quicker infiltration with a reduced resistance thereto, which, in turn, reduces the strength of the vacuum required and/or the time for which the vacuum needs to be applied, thereby reducing the cost of manufacture of the structure.

The reinforcement material may be in the form of carbon fibre or other materials, such as glass fibre, para-aramid synthetic fibre, other fibrous materials or a combination thereof. The honeycomb material can also be varied according to requirements and can include aluminium, aramid material, glass fibre, plastic, and other materials. For shaping curved components it might be preferable to use a suitable core which can conform to the contours of the mould, for example aramid based material such as Nomex®, Other open cellular structures that can be used instead of a honeycomb core include spacer fabrics or any other structure that can be filled up with microspheres and constrain them.

Inserts may be added into the mould or to the base and/or top lay-up or therebetween to further adjust the mechanical properties of the sandwich structure. These can be in the form of solid structures, for example metals and pre-cured composites, or porous materials, such as dry fabrics or porous rigid bodies, which can be infused together with the rest of the component. Additionally, or alternatively, additives may be mixed in with the microspheres, particularly in the form of toughening agents and/or milled or chopped fibre. For example, reaction induced phase separation (RIPS toughening) can be used to toughen the resin. Where the introduction of the toughener increases the viscosity of the resin too much, one can mix such additives in the form of powder, particles and/or fibre with the carrier liquid to create a solution, emulsion or suspension that retains a low viscosity. Once the carrier liquid is removed from the lay-up arrangement, the additives remain in the microsphere core and the resin can then be introduced, thereby providing the required properties to the resulting composition structure.

Figure 5:
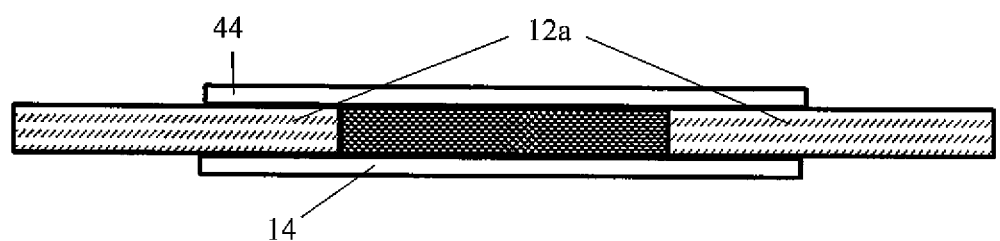
FIG. 5 is a diagram showing an arrangement for used in the present invention.

FIG. 5 shows an arrangement that may be employed as part of the present invention. The base surface of the mould 14 and the top mould 44 create a sandwich around the side walls of the mould 12a. The composite sandwich structure is created with the side walls bound thereto so that the mould side walls are integral to the final product that is the sandwich structure is bonded to the side walls, creating a composite sandwich structure with protrusions extending therefrom. In one form, the composite sandwich structure may comprise recesses into which the side walls of the mould are accepted to more securely attach the side walls to the sandwich structure. As a result of the arrangement in FIG. 5, or variations thereupon, the mould, or parts thereof, can become integral to the final product. Where the surface of the mould is partially or fully covered with a material that is incorporated in the final product, this negates the need for applying mould release material. Additionally, repair and maintenance of the mould becomes redundant because a new mould surface is required for each sandwich structure. Furthermore, where a resin is the precursor to a thermoplastic matrix, such as suitable acrylic resins, an acrylic film or sheet could be vacuum formed and held in place in the mould, or another arrangement, with the composite material subsequently being applied. Such an arrangement makes ejecting the resulting structure easier, removes the need for reapplying mould release and can provide a very smooth surface finish without requiring the use of gelcoats, polishing and the like.

Aspects of one embodiment of the present invention disclosed herein may be employed in addition or as alternatives to a different aspect of the present invention. For example, a step of the method of one embodiment may be used as an additional step or as an alternative to a step of another embodiment.

The invention claimed is:

1. A method of making a composite sandwich structure comprising the steps of:
   providing a base lay-up on a surface, wherein the base lay-up comprises a first reinforcement material layer;
   providing a core layer on to the base lay-up, wherein the core layer comprises a honeycomb open cellular structures;
   at least partially filling the honeycomb open cellular structure with a mixture of a carrier liquid and microspheres wherein the mixture flows and settles in a substantially uniform thickness in accordance with the profile of the honeycomb open cellular structure;
   providing a top lay-up on top of the core layer, wherein the top lay-up comprises a second reinforcement material layer;
   after the honeycomb open cellular structure is at least partially filled with unbound particles, then introducing matrix material into the core layer via a pressure differential; and
   curing the matrix material.

2. A method according to claim 1, wherein the microspheres comprise two or more different types of microspheres and wherein cells of the honeycomb open cellular structure are filled with two or more different types of microspheres.

3. A method according to claim 2, wherein the cells include a first group of cells filled with one type or combination of microspheres and a second group of cells filled with a different type or combination of microspheres.

4. A method according to claim 1, wherein preformed structures are placed in regions of the core layer to effect local sandwich structure properties.

5. A method according to claim 1, wherein the carrier liquid is the matrix material used for infusion.

6. A method according to claim 1, wherein excess carrier liquid is removed.

7. A method according to claim 1, wherein the arrangement is sealed within a hermetically sealed enclosure and the enclosure is provided with at least one conduit to allow fluid communication with the inside of the enclosure.

8. A method according to claim 7, wherein the matrix material is provided to the arrangement via the conduit.

9. A method according to claim 1, wherein the core layer with unbound microspheres is prepared directly onto the base layup.

10. A method according to claim 1, wherein the core layer with unbound microspheres is prepared prior to transferring onto the base layup.

11. A method according to claim 10, wherein multiple prepared core layers can be placed in the mould next to or on top of each other.

12. A method according to claim 1, wherein a barrier layer is provided on at least one side of the core layer.

13. A method according to claim 1, wherein the surface is the bottom internal surface of a mould and wherein the mould comprises sidewalls.

14. A method according to claim 1, wherein the matrix material is distributed via a pressure differential created using a vacuum source linked to the hermetically sealed enclosure via at least one conduit.

15. A method according to claim 1, wherein a release material is provided between the base lay-up and the mould and/or between the top lay-up and the top mould or vacuum bag.

16. The method according to claim 1, including the step of removing the carrier liquid from the honeycomb open cellular structure.

* * * * *